United States Patent
Kotlarsky et al.

(10) Patent No.: US 12,039,398 B1
(45) Date of Patent: Jul. 16, 2024

(54) BARCODE-AWARE OBJECT VERIFICATION USING IMAGE ENCODER

(71) Applicant: ZEBRA TECHNOLOGIES CORPORATION, Lincolnshire, IL (US)

(72) Inventors: Anatoly Kotlarsky, Churchville, PA (US); Christopher W. Brock, Manorville, NY (US); Andrea Mirabile, London (GB); Francesco Lupo, London (GB); Miroslav Trajkovic, Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/114,891

(22) Filed: Feb. 27, 2023

(51) Int. Cl.
  *G06K 7/10* (2006.01)
  *G06K 7/14* (2006.01)
(52) U.S. Cl.
  CPC ....... *G06K 7/10722* (2013.01); *G06K 7/1413* (2013.01)
(58) Field of Classification Search
  CPC .................. G06K 7/10722; G06K 7/1413
  See application file for complete search history.

(56) References Cited

U.S. PATENT DOCUMENTS

| 2012/0173347 A1* | 7/2012 | De Almeida Neves ..................... G06K 7/10861 705/16 |
| 2018/0314867 A1* | 11/2018 | Kotula ................. G06K 7/1413 |
| 2019/0108379 A1* | 4/2019 | Bachelder ............ G06K 7/1452 |

\* cited by examiner

*Primary Examiner* — Jamara A Franklin
(74) *Attorney, Agent, or Firm* — Yuri Astvatsaturov

(57) ABSTRACT

A method includes: capturing, by a scanner device comprising an image sensor, first image data representing at least a portion of a first item; detecting, by the scanner device, a first barcode represented in the first image data; decoding the first barcode to determine first identifier data for the first item; performing a lookup using the first identifier data to determine a first entry for the first item stored in a data store; generating a sub-image representing a region-of-interest of the first item; generating, using an image encoder, a first vector representation of the sub-image; comparing the first vector representation of the sub-image to at least one second vector representation stored in the data store in association with the first entry; and generating first data indicating that the first barcode is matched with the first item.

23 Claims, 9 Drawing Sheets

BARCODE-AWARE OBJECT VERIFICATION USING IMAGE ENCODER

BACKGROUND

Barcodes represent data in a visual, machine-readable form. One-dimensional barcodes, for example, represent data by varying the widths and/or spacing of a series of parallel lines. Two-dimensional barcodes (sometimes referred to as "matrix barcodes") are also used and may have additional capacity to encode data relative to one-dimensional barcodes due to their two-dimensional structure. Barcode scanners are devices that include optical elements that can read or otherwise interpret barcodes. A barcode may be decoded using a scanner to produce a code that may uniquely identify the barcode (and/or an object with which the barcode is associated).

SUMMARY

In various examples, methods of barcode-aware object verification are generally described. In some examples, the methods may include capturing, by a scanner device including an image sensor, first image data representing at least a portion of a first item. In some examples, the methods may further include detecting, by the scanner device, a first barcode represented in the first image data. In some examples, the methods may include decoding the first barcode to determine first identifier data for the first item. In still other examples, the methods may include performing a lookup using the first identifier data to determine a first entry for the first item stored in a data store. In various examples, a sub-image representing a region-of-interest of the first item may be generated. In yet other examples, an image encoder may generate a first vector representation of the sub-image. In various other examples, the first vector representation of the sub-image may be compared to at least a second vector representation stored in the data store in association with the first entry. In still other examples, the methods may include generating first data indicating that the first barcode is matched with the first item.

In various examples, barcode-aware object verification systems are generally described. In various examples, these systems may include an image sensor; at least one processor; and/or non-transitory computer-readable memory storing instructions. In various examples, the instructions, when executed by the at least one processor, may be effective to control an image sensor to capture first image data representing at least a portion of a first item. In some examples, the instructions may be further effective to detect a first barcode represented in the first image data. In still other examples, the instructions may be effective to decode the first barcode to determine first identifier data for the first item. In some further examples, the instructions may be effective to perform a lookup using the first identifier data to determine a first entry for the first item stored in a data store of the non-transitory computer-readable memory. In some other examples, the instructions may be further effective to generate a sub-image representing a region-of-interest of the first item. In some cases, the instructions may be effective to generate, using an image encoder, a first vector representation of the sub-image. In some other cases, the instructions may be effective to compare the first vector representation of the sub-image to at least a second vector representation stored in the data store in association with the first entry. In various examples, the instructions may be effective to generate first data indicating that the first barcode is matched with the first item.

In some other examples, other methods of barcode-aware object verification may be described. In some examples, such other methods may include receiving first image data representing at least a portion of a first item. In some cases, the methods may further include detecting a first barcode represented in the first image data. In various examples, the methods may include decoding the first barcode to determine first identifier data for the first item. In various examples, the methods may include performing a lookup using the first identifier data to determine a first entry for the first item stored in a data store. In still other cases, the methods may include generating a sub-image representing a region-of-interest of the first item. In some examples, the methods may further include generating, using an image encoder, a first vector representation of the sub-image. In some examples, the methods may include comparing the first vector representation of the sub-image to at least a second vector representation stored in the data store in association with the first entry. In various cases, the methods may include generating first data indicating that the first barcode is matched with the first item.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
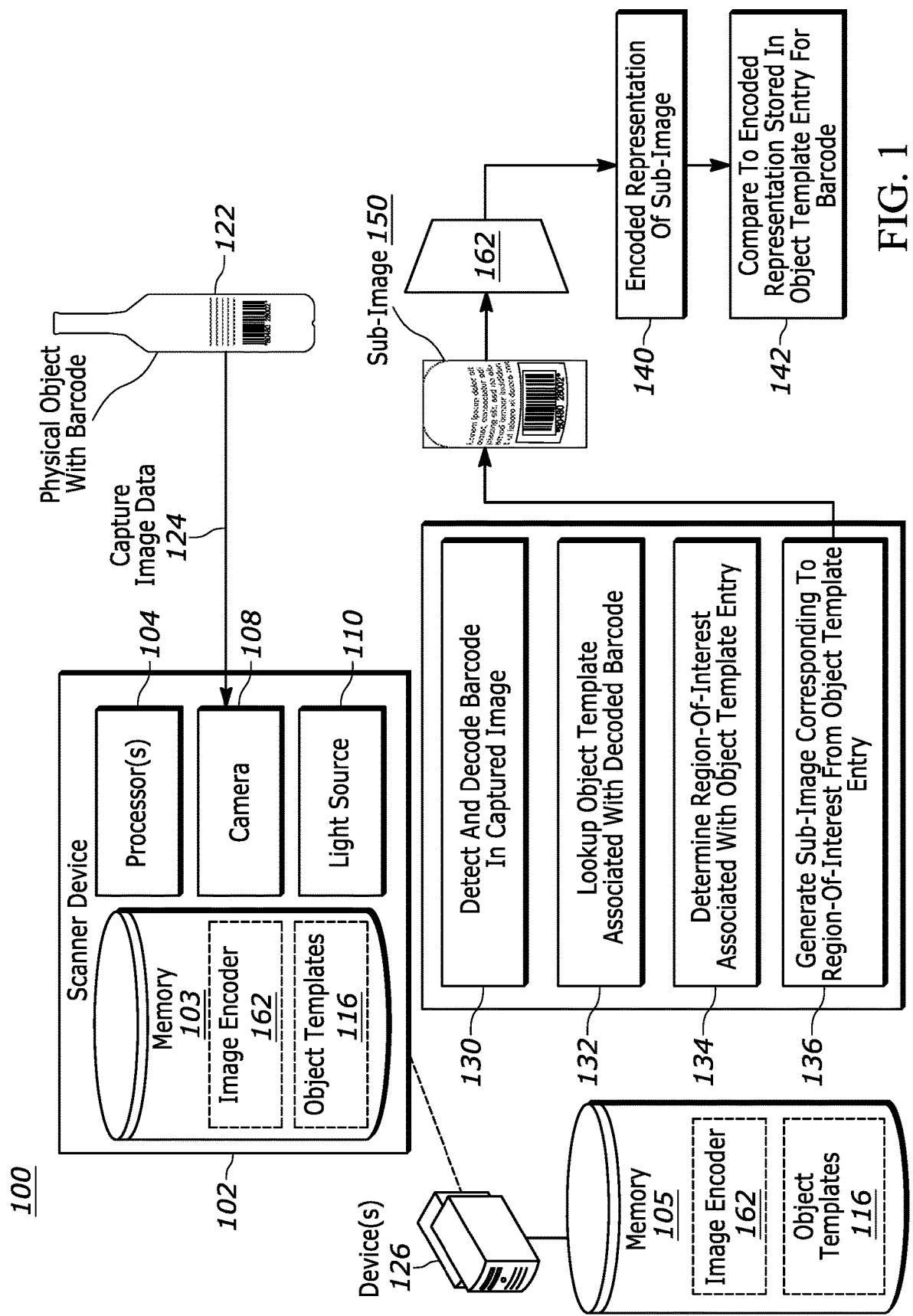
FIG. 1 is a diagram of a barcode-aware object verification system, in accordance with various aspects of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Barcodes can be used to quickly and accurately retrieve information about an object to which a barcode is affixed (or with which the barcode is otherwise displayed or associated). For example, barcodes can be used in point-of-sale systems to determine the price of objects, thereby speeding up the checkout process. In other examples, barcodes may be used in inventory systems to provide information such as object quantity, category, price, location, etc. In general, a barcode may be a visual code that may be scanned and decoded using a hardware and/or software-based barcode scanner (sometimes referred to as a barcode reader) to generate a code that identifies the barcode and, by extension, the object with which the barcode is associated. The code that is encoded by a barcode may be used as an index into a database that may store additional information about the object. The specific information that may be stored may vary according to the desired implementation. For example, in point-of-sale barcode systems the database entry associated with a barcode may include the price of the item (among other data).

Some barcode scanners (particularly those used for one-dimensional barcodes) may use laser light (or other light) to scan barcodes. The decoded visual information may be used to lookup the information associated with the barcode in the database. In some examples, barcode scanners may use cameras including image sensors (e.g., complementary metal oxide semiconductor (CMOS) and/or charge-coupled device (CCD) image sensors) which may capture frames of image data (e.g., including two-dimensional arrays of pixels, with each pixel having a corresponding pixel value). Barcodes represented in the images captured by such camera-based barcode scanners may be detected using any desired object detection and/or barcode detection technique and decoded. Camera-based barcode scanners may be effective to detect and decode two-dimensional matrix barcodes (such as quick response (QR) codes). As with one-dimensional barcodes, the decoded barcode code (e.g., an alphanumeric string, numeric code, etc.) may be used to lookup the corresponding entry for the object associated with the barcode.

A particular type of fraud that is sometimes referred to as "ticket switching" involves switching the barcode on one object for a barcode that is associated with a different object. For example, a high value item such as a consumer electronic item may have a barcode label adhered to or printed on its packaging. A bad actor may take a barcode label from another, typically less-expensive good, and affix this barcode over the barcode on the consumer electronic item. Accordingly, during checkout, the decoded barcode will result in the bad actor being charged for the lower-priced item instead of the correct price for the consumer electronic item.

Described herein are various systems and techniques that may be used to verify that the object is properly associated with the barcode scanned for the object. In various examples, a machine learning-based image encoder may be deployed on a camera-based barcode reader and/or another device that is configured in communication with the camera-based barcode reader. An image of an object that includes a barcode may be captured by the camera-based barcode reader. The barcode may be detected, decoded and the resulting decoded barcode code may be used to perform a lookup in memory for an entry in a database associated with the barcode. The entry may, in some cases, be referred to herein as an object template. The object template entry may define a particular region-of-interest of the object. As described in further detail below, the barcode reader and/or other computing device configured in communication with the barcode reader may generate a sub-image of the object that corresponds to the region-of-interest defined in the object template entry. An image encoder may be used to encode the sub-image of the object corresponding to the region-of-interest. This encoded representation (e.g., a "signature vector" or multiple vectors, feature maps, etc.) may be compared against a signature vector (and/or other data representation) stored in the object template that is representative of the region-of-interest for the object. In some other examples, the encoded representation may be compared against multiple representative vectors and/or other data structures representative of the region-of-interest in the object template. In some examples, the data representation stored in the object template as representative of the region-of-interest for the object may be a combination of multiple encodings (e.g., multiple vectors) generated from various different images of the region-of-interest of the object (e.g., to account for variability in such images). A determination may be made of whether the decoded barcode is properly associated with the object based on a similarity (and/or distance in the feature space) between the vector representation generated from the captured image and the vector representation stored in the object template entry.

Defining a region-of-interest of a given object in an object template entry may provide a standard for comparison of images of the object. This is because images captured by the barcode reader may be captured from various angles, orientations, and/or distances, may depict different portions of the overall object or packaging, may be captured under different illumination conditions, etc. Accordingly, the object template entry may define a region-of-interest with respect to a barcode of the object (since the barcode is used to lookup the object template entry). The region-of-interest in the object template entry may be used to crop the captured image so that the resulting sub-image represents a relatively standardized region-of-interest of the object. This sub-image may be encoded and, if the object properly corresponds to the object template entry for the barcode, the encoded representation should be similar to the encoded representation stored in the object template entry. Advantageously, using an image encoder to generate vector representations of the object images may eliminate the requirement that item images be stored in memory. This may enable the barcode-aware object verification systems and techniques described herein to be deployed on resource-constrained devices (e.g., such as on the barcode scanners themselves and/or on another device that is in communication with the barcode scanner).

In addition to the information about the barcode in a given object's template (e.g., the barcode type, identifier data (e.g., the decoded code of the barcode), the coordinates of the barcode in the template image, etc.) the object template data can also include information about coordinates of the region-of-interest in the template image. Accordingly, the object template entry for a given object, which may be looked up using a decoded barcode, establishes a tight correlation of the object's region-of-interest with the size, location, and orientation of the object's barcode. This information may be used to generate consistent sub-images that correspond to the region-of-interest defined in the object template entry, in spite of the various differences in object-views of different images of the object captured by the barcode scanner during scanning.

A given object template entry (which may also be referred to as "item template data") may be stored in memory of the scanner device and/or in memory of another device that is configured in communication with the scanner device (e.g., a point-of-sale computing device and/or a remote computing device). When a scanner device captures an image of an object that includes the barcode, the barcode may be detected, decoded, and the decoded barcode code may be used to lookup the object template data in memory. The object template entry may, in some examples, include a template image for the object. However, in some other examples, the object template entry may not store the image and may instead store one or more vector representations (e.g., one or more signature vectors) representing the region-of-interest for the object. In order to define the region-of-interest, the template image may include information about the location, dimensions, and/or orientation of the barcode in the template image as well as information about a region-of-interest for the item. For example, first bounding box data may identify the location, position, and/or orientation of a barcode in the template image used to generate the representative signature vector, while second bounding box data may establish a region-of-interest for the first item. A sub-image corresponding to the region-of-interest may be extracted from the captured image of the object using the relationship between the barcode in the template image and the region-of-interest defined in the object template entry. In some examples, geometric transformations may be performed based on the size, location, and/or orientation of the barcode in the captured image as compared to the barcode information in the object template entry. These transformations (sometimes referred to as "de-skewing") may be used to provide a consistent sub-image that accurately reflects the region-of-interest for the item defined in the object template data in spite of the captured image being closer, further away, capturing a different portion of the object, and/or being captured at a different orientation relative to the template image.

The encoded representation of the extracted sub-image (e.g., the signature vector representing the object scanned by the barcode scanner) may be compared to one or more encoded representations stored in the object template entry using any desired distance metric (e.g., cosine distance, cosine similarity, Euclidean distance, etc.). If the distance and/or similarity is within a predefined threshold (e.g., a threshold distance value or threshold similarity score), this indicates that the barcode and the object are properly associated with one another (e.g., no ticket switch has occurred and a sale of the item may proceed). In various examples, the encoded representation(s) stored in the object template entry may represent an amalgamation of multiple different images of the relevant object (e.g., of the region-of-interest of the object from various images). For example, signature vectors may be generated for each of a plurality of images of the object (after region-of-interest extraction). The signature vectors may be averaged (or otherwise combined) such that the resulting combined signature vector represents the region-of-interest of the object with various discrepancies (e.g. under different illumination conditions, slightly varying angles, etc.). In various other examples, vector clustering of multiple signature vectors may be used (e.g., k-means clustering) to generate multiple clusters of vectors with each cluster having a representative vector. It should be noted that an encoded representation of the sub-image extracted from the scanner-captured image may be compared to a single signature vector, a combined signature vector representing an amalgamation of multiple images of the region-of-interest, or to multiple different encoded representations of different images of the region-of-interest according to the desired implementation.

In some alternate examples, instead of comparing the signature vector for the region-of-interest of the captured image to a signature vector (or other encoded representation) in the object template image, the signature vector for the captured image may be used to search for the most similar signature vector in a database of signature vectors for different objects. For example, K-nearest neighbors or some other technique may be used to determine the most similar signature vectors or cluster of signature vectors. In this way, it may be determined to what object template the captured image is likely to pertain. However, it may be more computationally efficient to simply compare the signature vector for the captured image to the signature vector for the object template entry (which was determined using the barcode in the captured image).

As previously described, if the distance and/or similarity is within a predefined threshold, this indicates that the barcode and the object are properly associated with one another (e.g., no ticket switch has occurred and a sale of the item may proceed). Conversely, if the predicted object does not match with the object associated with the barcode, a ticket switch may have occurred. An error message, or other output indicating a mismatch, may be generated. Advantageously, providing a consistent region-of-interest of the captured image as determined using the region-of-interest defined in the object template data may provide a consistent basis for comparison.

Advantageously, using the various techniques described herein, when a new item is to be added to inventory, no model re-training (e.g., of a machine learning classifier) is required in order to detect ticket switches for the new item. Instead, an object template entry for the new item may be created that defines the region-of-interest for the new item. The region-of-interest may be determined in a variety of ways. For example, the region-of-interest may be automatically determined (e.g., using image segmentation techniques), may be defined automatically relative to the location of the barcode, or may be manually selected by a user. At least one image of the region-of-interest of the new item may be encoded using the image encoder. The resulting encoded representation(s) (e.g., signature vector(s)) may be stored in the object template entry. As described herein, other information may be stored in the object template entry as well, such as barcode size, orientation, type, location (in the template image), etc. Furthermore, region-of-interest information (size, location, orientation) may be stored in the object template entry. Thereafter, when scanning an instance of the new item, the decoded barcode may be used to retrieve the object template data. The sub-image may be generated according to the region of interest defined in the object template data. The sub-image may be encoded using the image encoder and the encoded representation of the sub-image can be compared against the stored encoded representation(s) (e.g., signature vector(s)) of the object template entry to determine whether the scanned barcode is properly associated with the object.

Machine learning techniques may be used to recognize and/or classify objects in image data and/or to generate encoded representations of inputs and/or to generate predictions. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a diagram 100 of a barcode-aware object verification system, in accordance with various aspects of the present disclosure. The scanner device 102 is depicted with various components that may be included in a camera-based barcode reader, although additional components, fewer components, and/or different components may be included in various implementations.

Scanner device 102 may comprise one or more processors, such as processor(s) 104, one or more memories, such as non-transitory computer-readable memory 103, a camera 108 (e.g., a CMOS-based camera and/or CCD-based camera), and/or a light source 110. The light source 110 may be effective to output light in any desired wavelength (e.g., infrared) in order to illuminate the scene for capturing images by the camera 108. In various examples, the light source 110 may be optional. In various examples, the memory 103 may store various object templates 116, as described in further detail below. Additionally, in some examples, the scanner device 102 may execute the various barcode-aware object verification steps described herein, while in other examples, a remote device or devices (e.g., device(s) 126) may store one or more object templates 116 and/or may execute one or more of the various barcode-aware object verification steps. Device(s) 126 may be a point-of-sale device, a server device, and/or some combination of the two. Device(s) 126 may include a non-transitory computer-readable memory 105 which may, in some cases, store the object templates 116.

In various further examples, computer-readable instructions configured to execute the image encoder 162 (including the model's parameters) may be stored in memory 103 and/or memory 105. In various examples, the various processing techniques described herein may be executed locally on the scanner device 102 and/or on a local point-of-sale computing device in order to provide low-latency barcode-aware object verification.

Memory 103 and/or 105 may include one or more non-transitory storage media such as, for example, volatile and/or non-volatile memory that may be either fixed or removable. Memory 103 may be configured to store information, data, applications, instructions or the like for enabling scanner device 102 and/or device(s) 126 (and components thereof) to carry out various functions in accordance with the various examples described herein. For example, the memory 103 could be configured to buffer input data for processing by processor(s) 104. Additionally or alternatively, the memory could be configured to store instructions for execution by processor(s) 104. Memory 103 and/or 105 may in some cases be considered primary memory and be included in, for example, RAM or other forms of volatile storage which retain its contents only during operation, and/or memory 103 and/or 105 may be included in non-volatile storage, such as ROM, EPROM, EEPROM, FLASH, or other types of storage that retain the memory contents independent of the power state of the scanner device 102 and/or device(s) 126. Memories 103, 105 could also be included in a secondary storage device, such as external disk storage, that stores large amounts of data. In some embodiments, the disk storage may communicate with processor(s) 104 using an input/output component via a bus or other routing component. The secondary memory may include a hard disk, compact disk, DVD, memory card, or any other type of mass storage type known to those skilled in the art.

The scanner device 102 may be activated (e.g., via a trigger pull or simply by placing an object in the field-of-view of an activated camera 108) to capture image data 124 of a physical object that includes a barcode 122. In the example depicted in FIG. 1, the object is a bottle that includes some text, graphics, and a barcode.

The memory 103 may store instructions effective to detect and decode the barcode included in the captured image data 124 (at block 130). For example, detecting the barcode may involve using an object detector to detect the barcode and/or to generate a bounding box around the barcode in the captured image. Decoding the barcode may include generating the decoded code (e.g., an alphanumeric string, a numeric code, and/or some other data representation of a code) that is encoded by the barcode. The code may be used, at block 132 to perform a lookup to determine an object template entry (e.g., among object templates 116) that is associated with the decoded barcode.

As described in further detail below, the object template entry may include identifier data that identifies the barcode from among other barcodes (e.g., the decoded code from the barcode). In some examples, the object template entry may include an encoded representation of the region-of-interest of the object. The object template entry may, in some examples, include an image of the region-of-interest, while in other examples, the object template entry may merely include the representative encoded representation, as well as information that may be used to extract the region-of-interest. In some further examples, the object template entry may include data describing one or more of the size, orientation, and location of the barcode for the object template entry. Additionally, the object template entry may include data describing one or more of the size, orientation, and location of the region-of-interest for the object template entry (which may or may not include all or a portion of the barcode). In still other examples, the object template entry may include other metadata such as a barcode type (e.g., UPC, QR, etc.). At block 134, the region-of-interest associated with the object template entry may be determined.

In various examples, the region-of-interest of the captured image data 124 may be determined based on a comparison of the barcode in the captured image data 124 with the barcode information represented by the object template entry. As described in further detail below, the region-of-interest defined by the object template entry may be applied to the captured image data 124 according to the relationship between the region-of-interest in the object template entry, the barcode in the object template entry, and the detected barcode in the captured image data 124. At block 136, the sub-image corresponding to the region-of-interest from the object template entry may be generated by cropping the captured image data 124 according to the region-of-interest defined in the item template and applied to the captured image data 124.

The sub-image 150 may be input into the image encoder 162. The image encoder 162 may be a machine learning based image encoder that may be used to generate dense feature embeddings that represent the input images in a high-dimensional feature space. The image encoder 162 may generate an encoded representation of the sub-image (block 140) that was extracted from the captured image data 124 using the object template entry. In various examples, the encoded representation of the sub-image may be a vector (e.g., a signature vector). However, other encoded representations are also possible (e.g., feature maps, etc.) and can be used in accordance with the desired implementation. The generated encoded representation may be compared to the encoded representation stored in the object template entry for the decoded barcode from the captured image data 124 (block 142). For example, if the encoded representations are signature vectors, a distance metric such as cosine similarity, Euclidean distance, etc., may be used to determine a distance and/or similarity of the two encoded representations. If the similarity is above a relevant threshold (or the distance is below a relevant threshold), a determination may be made that the barcode is properly associated with the object. Accordingly, the scanned barcode may be deemed to be properly associated with the object/item. Conversely, if the similarity is too low (or the distance too high), the scanned object may be deemed mismatched with respect to the barcode. Various actions may be taken in response to a detected mismatch, such as declining a transaction, generating an error code indicating an object/barcode mismatch, generating a buzzer sound, etc. The particular output actions are dependent on the desired implementation and/or user interface design and may vary accordingly.

Figure 2:
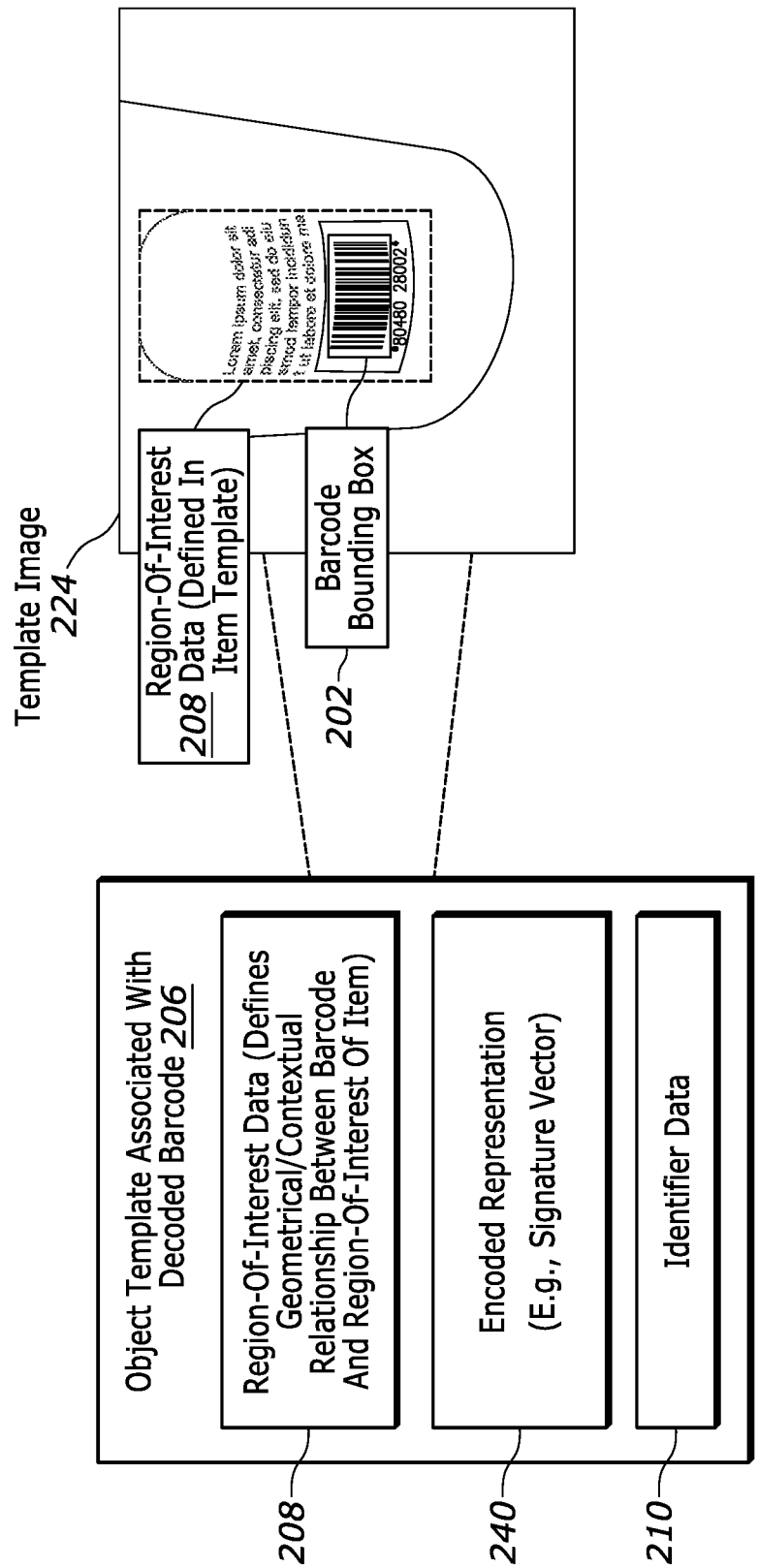
FIG. 2 depicts an example of an object template associated with a decoded barcode, in accordance with various aspects of the present disclosure.

FIG. 2 depicts an object template associated with a decoded barcode, in accordance with various aspects of the present disclosure. A template image 224 is depicted of a portion of an object in FIG. 2. The template image 224 may, in some cases, be stored in the object template entry that is associated with the decoded barcode 206. However, in some examples, instead of storing the template image 224, data describing a location of the barcode bounding box 202 (e.g., coordinates in the image frame), dimensions (e.g., height and width in terms of pixels), orientation (e.g., with respect to a vertical pixel axis, horizontal pixel axis, or some other reference) and data describing the region-of-interest data 208 may be included without storing any image data. This may reduce memory requirements and may enable a resource-constrained device (e.g., a barcode scanner or other device) to store more templates. The object template entry associated with the decoded barcode 206 may also store data representing the spatial and/or geometric relationship between the barcode in the object template entry and the region-of-interest in the object template entry. This relationship between the template barcode and region-of-interest may be used to determine where to crop the captured image based on the location/size/orientation of the barcode detected in the captured image in order to generate a sub-image that corresponds to the region-of-interest for the item. The object template entry associated with the decoded barcode 206 may also store the encoded representation(s) 240, which may represent one or more encoded representations of the region-of-interest for the object. As previously described, this may be generated using one or more images of the object cropped according to the region-of-interest data 208, encoded using image encoder 162, and combined (if multiple images are used). For example, template image 224 may be used to generate one or more encoded representations 240 (even if template image 224 itself is not stored as part of the object template entry).

As shown in FIG. 2, the object template entry associated with the decoded barcode 206 may include region-of-interest data 208 which may define the geometrical and/or contextual relationship between the barcode for the template image and the region-of-interest for the template image. Accordingly, the region-of-interest data 208 may include data representing a location, dimensions, and/or orientation of the barcode bounding box 202 in the template image. In some further examples, the region-of-interest data 208 (or the object template entry) may include data representing a type of the barcode (e.g., QR code, UPC code, etc.). Additionally, the region-of-interest data 208 may include data representing a location, dimensions, and/or orientation of the region-of-interest of the template image. The region-of-interest of the template image may or may not include all or a portion of the barcode. For example, in the template image 224 shown in FIG. 2, the bounding box for the region-of-interest data 208 subsumes the barcode bounding box 202. However, in other cases, the region-of-interest defined in the object template entry may not include the barcode. In some other examples where the region-of-interest does include the barcode, pixels in the barcode bounding box may optionally be disregarded by the image encoder and/or the sub-image may replace all pixels in the bounding box with a predefined pixel value in order to mask out the barcode prior to encoding the sub-image. The term "bounding box," as used herein may refer to data defining a perimeter that surrounds a region-of-interest (or a barcode) in image data. The perimeter defined by a bounding box may be of any desired shape (e.g., any polygon such as a square, rectangle, hexagon, etc.). In some cases, the bounding box may be user defined (e.g., a user drawn perimeter around a region-of-interest). In some examples, the region-of-interest may be the entire image frame.

The region-of-interest data 208 for a given item template may be generated in any desired manner. For example, the region-of-interest data 208 may be automatically determined (e.g., using image segmentation techniques), may be automatically defined relative to a location of the barcode, or may be manually selected by a user.

The region-of-interest data 208 may also describe a spatial and/or geometrical relationship of the region-of-interest. For example, as shown in FIG. 2, the region-of-interest data 208 may specify the coordinates of a bounding box of the barcode in the template image and/or the coordinates of a bounding box of the region-of-interest in the template image. As such, upon detection of a barcode in a captured image, the appropriate region-of-interest of the captured image may be determined based on the location, dimensions, and/or orientation of the barcode in the captured image and the relationship between the barcode bounding box 202 and the region-of-interest data 208 in the object template entry. Accordingly, sub-images of captured images may be generated by cropping captured image data to generate the portion of the captured image data (e.g., the sub-image) that corresponds to the region-of-interest specified in the object template entry.

The object template entry may also include any other desired information (e.g., price, quantity in inventory, other identifier codes, etc.). In the example depicted in FIG. 2, the object template entry may include identifier data 210 that identifies the object template entry from among other object templates. The identifier data 210 may be, for example, the decoded code for the barcode (e.g., an alphanumeric string or numeric code) that uniquely identifies the item or item type from among other items.

Figure 3:
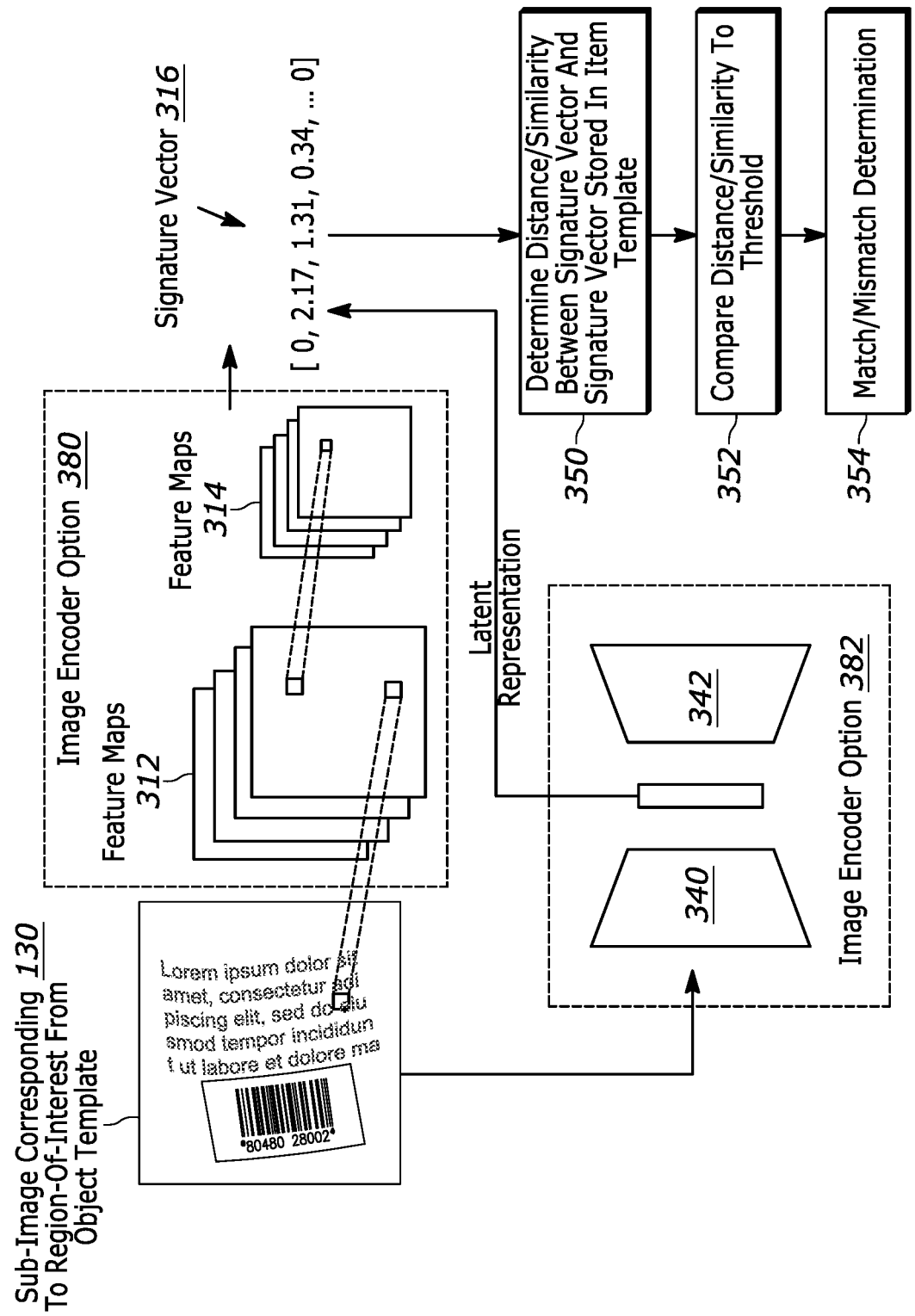
FIG. 3 is depicts an example machine learning architecture that may be to encode a sub-image of an object for barcode-aware object verification, in accordance with various aspects of the present disclosure.

FIG. 3 is depicts examples of machine learning image encoder architectures that may be used to encode images of objects for barcode-aware object verification, in accordance with various aspects of the present disclosure. It should be noted that the example machine learning architectures in FIG. 3 are merely two examples of image encoders and that any other desired image encoder architectures may be used in accordance with the various techniques described herein to provide barcode-aware object verification.

As previously described, the input to the image encoder options 380, 382 may be the sub-image 310 that has been generated using the captured image based on the region-of-interest defined in the item template data for the decoded barcode. In the example depicted in FIG. 3, the sub-image 310 includes the barcode. However, as previously described, in other examples, the region-of-interest defined in the item template may not include the barcode. In still other examples, the barcode may be masked out such that the encoded sub-image does not represent the barcode in the captured image. In FIG. 3, image encoder option 380 may include a convolutional neural network (CNN) image encoder. In various examples, A pre-trained CNN image encoder may be used (e.g., trained for an image classification task). However, as known to those of ordinary skill in the art, other computer-vision based image encoder networks may be used. For example, recurrent neural network-based image encoders (RNNs), transformer-based image encoders (e.g., the Vision Transformer model (ViT)), etc., may be used. Accordingly, the architecture depicted in FIG. 3 is merely used to show one possible implementation.

In an alternate example, an encoder-decoder architecture may be used for image encoder option 382 (including encoder 340 and decoder 342). For example, a variational autoencoder or other autoencoder may be trained using reconstruction loss to generate high-dimensional latent representations of input sub-images. In the example shown in FIG. 3, the encoded representation of the sub-image 310 is the signature vector 316. The encoder 340 may take the sub-image 310 as input and may generate a latent representation of the input. The decoder 342 may attempt to reconstruct the input image from the latent representation during training. Thereafter, reconstruction loss may be determined as the difference (e.g., pixel-wise) between the input image and the reconstructed image data.

The sub-image 310 may be a frame of image data including a two-dimensional grid of pixel values. Additional data may be included with the input sub-image 310 such as histograms representing tonal distribution of the image. In the CNN-based image encoder option 380, a series of convolution filters may be applied to the image to generate feature maps 312. The convolution operation applies a sliding-window filter kernel of a given size (e.g., 3×3, 5×5, in terms of pixel height and width) over the image and computes a dot product of the filter kernel with the pixel values. The output feature map 312 for a single convolution kernel represents the features detected by the kernel at different spatial locations within the input frame of image data. Zero-padding may be used at the boundaries of the input image data to allow the convolution operation to compute values for the columns and rows at the edge of the image frame.

Down-sampling may be used to reduce the size of the feature maps 312. For example, max-pooling may be used to down-sample feature maps 312 to generate reduced-size feature maps 314 (modified feature maps relative to the feature maps 312). Other pooling techniques may instead be used to down-sample feature maps 312 and generate feature maps 314. Generally, pooling involves a sliding window-filter over the feature maps 312. For example, using a 2×2 max-pooling filter, the largest value from a feature map 312 in a given window (at a given frame location) may be used to represent that portion of the feature map 312 in a down-sampled feature map 314. Max-pooling uses the features with the highest impact on a given window and reduces processing time at subsequent operations. Although not shown in FIG. 3, an activation function may be applied to the reduced size feature maps 314 following the pooling operation. For example, the Rectified Linear Unit (ReLU) activation function or sigmoid function may be applied to prevent diminishing gradients during training.

FIG. 3 depicts only a single convolution stage and a single pooling stage. However, any number of convolutions and pooling operations may be used in accordance with the desired implementation. Once the convolution and pooling stages are completed, the classifier model may generate an encoded representation such as signature vector 316 (e.g., a column vector) from the resulting feature maps by converting the two-dimensional feature maps (e.g., arrays) into one-dimensional vectors. In various examples, the signature vector 316 may be a dense feature representation of the input sub-image 310 (e.g., an embedding representing the sub-image 310).

At action 350, a distance metric may be used to compare the signature vector 316 (representing the sub-image 310) with the one or more encoded representations for the object stored in the object template entry (e.g., the previously-stored signature vector(s) for the object template entry). The distance/similarity may be compared to a relevant threshold (block 352) and a match/mismatch may be determined (block 354). For example, if cosine similarity is used as the similarity metric, a determination may be made whether the cosine similarity exceeds a threshold value. If so, a match may be determined indicating that the object scanned by the barcode reader corresponds to the scanned barcode. Conversely, if the cosine similarity is less than the threshold (or a different, low threshold), a mismatch may be determined, indicating that a ticket switch may have occurred. In some examples, instead of using one or more static thresholds, outlier detection methodology may be used (e.g., by determining whether a given similarity and/or distance score is greater than 2a (or some other desired standard deviation) from a mean score.

Figure 4A:
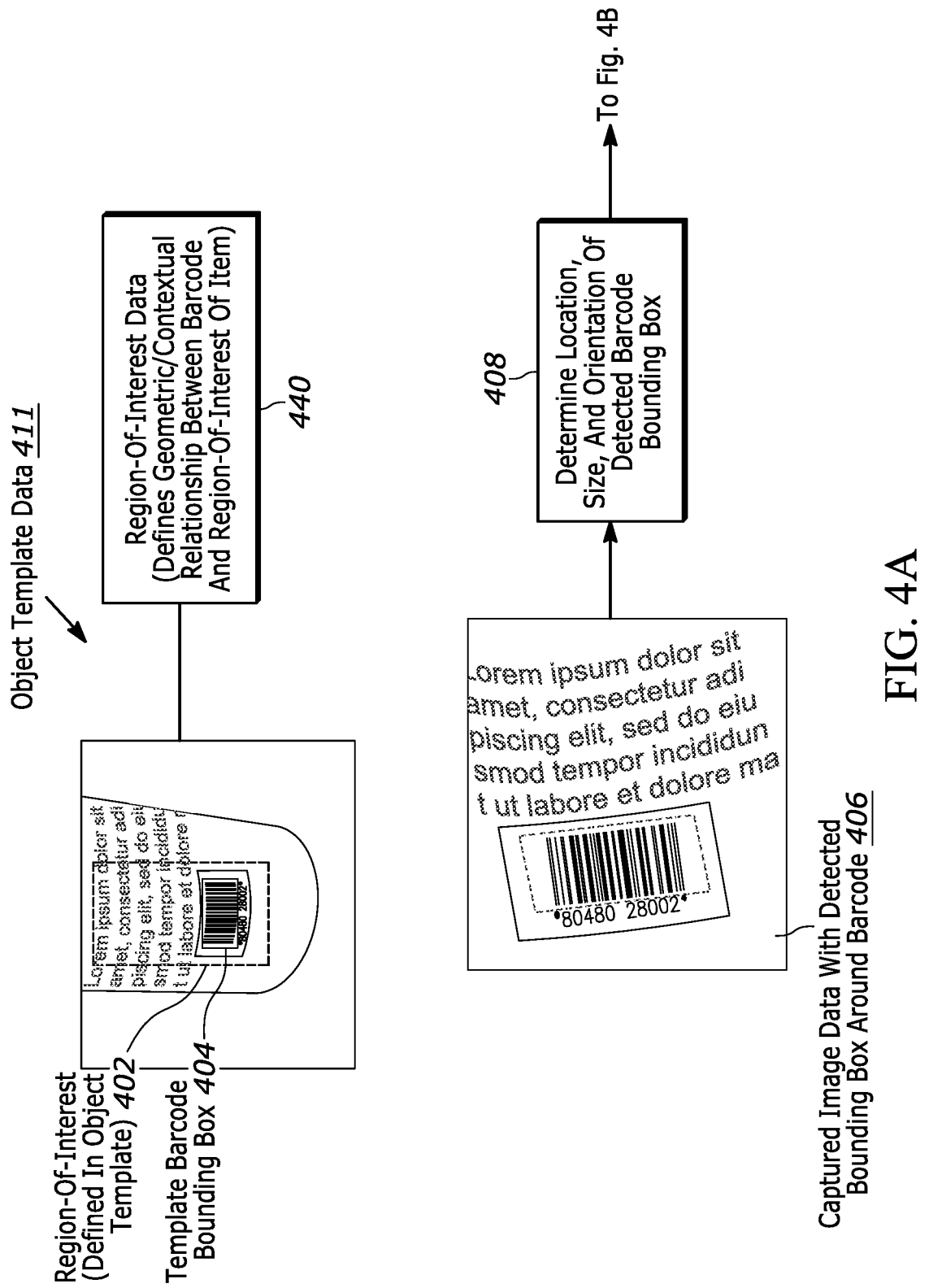
FIGS. 4A-4B illustrate example image processing techniques that may be used to generate sub-images corresponding to regions-of-interest of objects, in accordance with various aspects of the present disclosure.
Figure 4B:
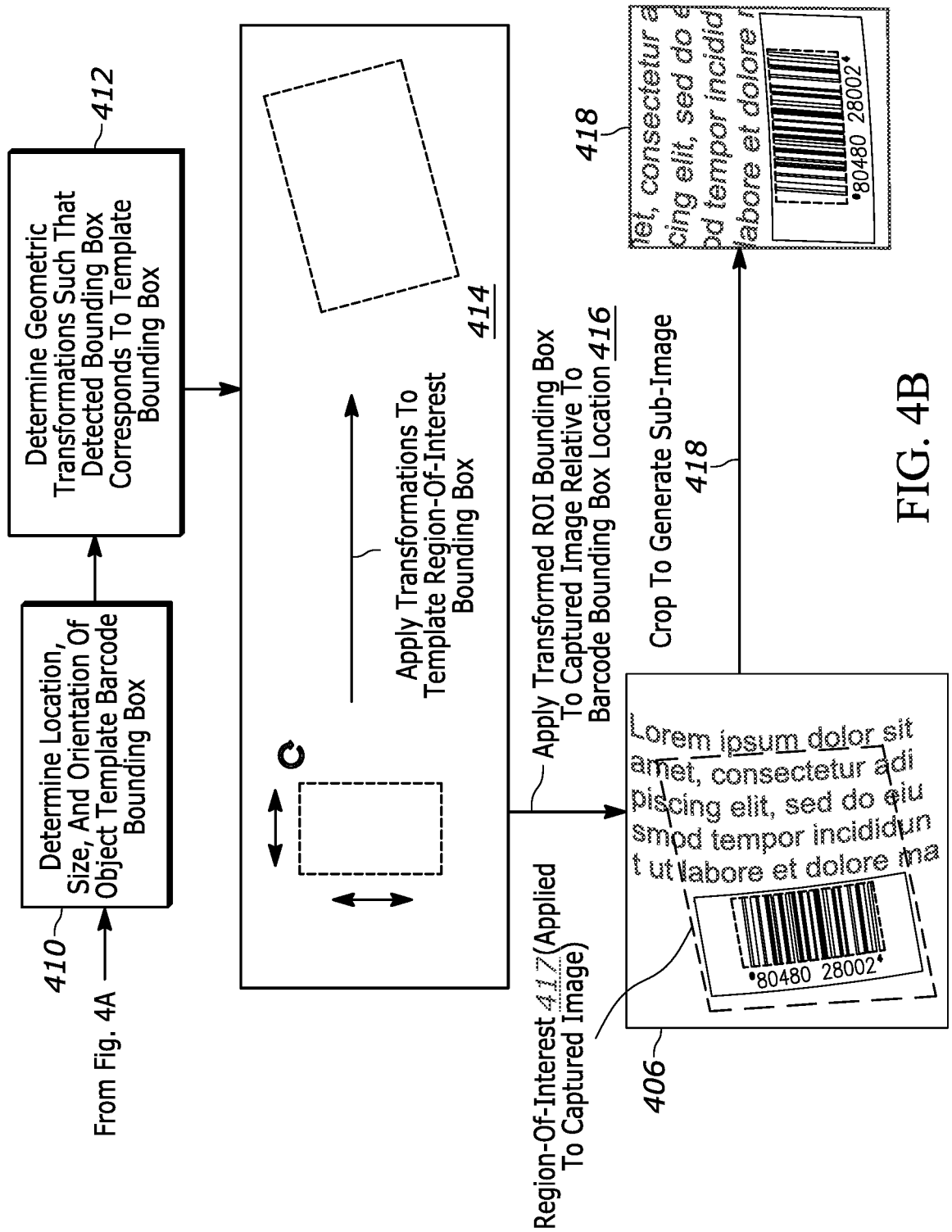

FIGS. 4A-4B illustrate example image processing techniques that may be used to generate sub-images corresponding to regions-of-interest of objects, in accordance with various aspects of the present disclosure. In FIG. 4A, an item may have been scanned using a camera-based barcode reader to generate captured image data. A barcode may be detected in the captured image data. Accordingly, FIG. 4A depicts captured image with detected bounding box around barcode 406. Upon decoding the detected barcode, the object template data 411 that is associated with the decoded barcode code (e.g., the identifier data for the barcode) may be determined (e.g., using a lookup). The object template data 411 defines a region-of-interest 402 and a template barcode bounding box 404. In some examples, this information may be stored as coordinate data in the object template data 411. In some cases, a template image (as shown in FIG. 4A) may be stored in the object template data 411, while in other scenarios a template image may not be stored. The region-of-interest data 440 defines a geometric and/or contextual relationship between the barcode in the template image and the region-of-interest of the item.

As shown in FIG. 4A, the orientation and size of the barcode in the captured image both differ significantly relative to the barcode in the template image (e.g., the image associated with the object template data 411). In addition, the amount of the bottle that is represented in the captured image is significantly different than the amount of the bottle in the template image, with the captured image framing the barcode more closely.

At action 408, the location (e.g., pixel coordinates of the bounding box), size (e.g., width and height, in terms of pixels), and orientation (e.g., angle of rotation relative to a selected axis) of the detected barcode bounding box may be determined. Processing may continue to action 410 of FIG. 4B. At action 410, a location, size, and orientation of the item template barcode bounding box may be determined. This data may be stored in the object template data 411 and/or may be determined using the barcode in the template image. Processing may continue to action 412, at which the geometric transformations may be determined such that the detected bounding box (around the barcode 406 in the captured image) corresponds to the template bounding box (e.g., in terms of one or more of location, size, and/or orientation). For example, a ratio of the dimensions of the barcode in the captured image vs. the template image may be determined. An angle and direction of rotation to rotate the barcode in the template image such that it corresponds to the barcode in the captured image may be determined. A translation of the barcode within the image frame may be determined such that the re-sized and/or re-oriented barcode appears at the same location in the frame (relative to the barcode in the captured image).

At action 414, these geometric transformations may be applied to the region-of-interest bounding box of the object template data 411 so that the region-of-interest of the item in the captured image may be determined. For example, as shown in FIGS. 4A, 4B, the bounding box for the region-of-interest 402 defined in the template has been rotated and re-sized to capture a corresponding region-of-interest (e.g., region-of-interest 417) of the bottle in the captured image 406. The transformed (e.g., rotated, re-sized, and/or translated) region-of-interest bounding box may be applied to the captured image relative to the barcode bounding box location in the captured image (block 416) as region-of-interest 417. Thereafter, the captured image may be cropped to the region-of-interest to generate sub-image 418. The sub-image 418 now corresponds to the region-of-interest of the item defined in the object template data 411 and can be encoded using an image encoder (e.g., FIG. 3).

Figure 5:
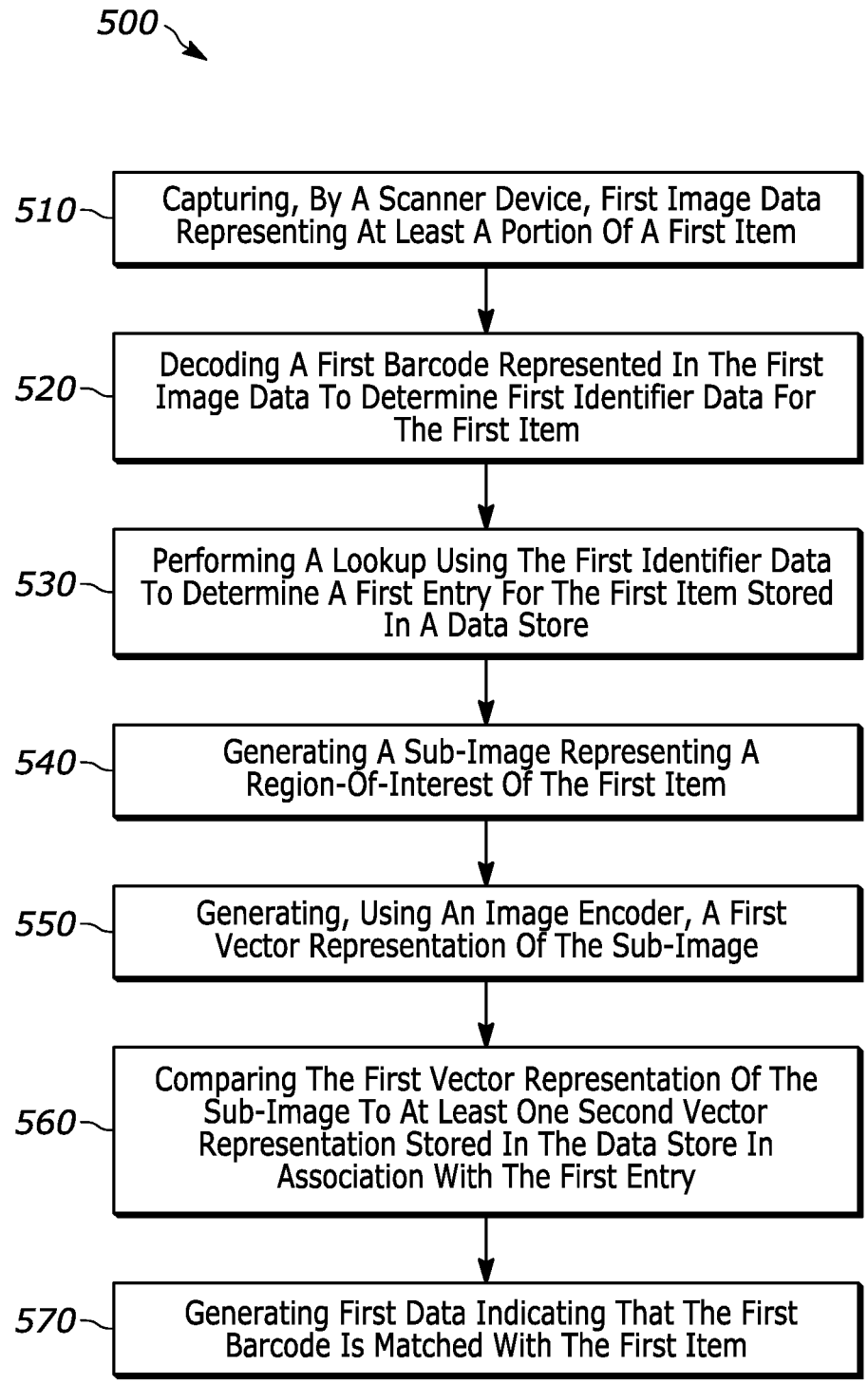
FIG. 5 is flowchart illustrating an example process 500 for barcode-aware object verification, in accordance with various aspects of the present disclosure.

FIG. 5 is flowchart illustrating an example process 500 for barcode-aware object verification, in accordance with various aspects of the present disclosure. Although the example process 500 is described with reference to the flowchart illustrated in FIG. 5, it will be appreciated that many other methods of performing the acts associated with the process 500 may be used. For example, the order of some of the blocks may be changed, certain blocks may be combined with other blocks, blocks may be repeated, and some of the blocks described may be optional. The process 500 may be performed by processing logic that may comprise hardware (circuitry, dedicated logic, etc.), software, or a combination of both. In some examples, the actions described in the blocks of the process 500 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

Processing may begin at action 510, at which a scanner device (e.g., a camera-based scanner device) may capture first image data representing at least a portion of a first item. For example, a scanner device may be used to capture an image of a first item, the image including a barcode affixed to, or otherwise associated with, the first item.

Processing may continue at action 520, at which the first barcode in the captured image data may be detected and decoded to generate a decoded barcode code. The decoded barcode code may be an alphanumeric string, a numeric code, and/or any other desired code that is associated with the barcode.

Processing may continue at action 530, at which a first entry (e.g., an object template entry) associated with the first barcode may be determined by using the first identifier data to lookup the first entry. For example, the decoded barcode code determined at action 520 may be used to perform a lookup in a data structure to determine the an entry corresponding to the first item among object templates stored in memory. The first entry may include first identifier data (e.g., the decoded barcode code), first region-of-interest data, and a vector representation representing an encoded region-of-interest of the first item. The first region-of-interest data may define a region-of-interest of the first item. At least a portion of the first region-of-interest may be a non-barcode portion of the item. In some examples, the first entry may further include a template image. In some cases, the first entry may include data identifying coordinates of a barcode in the template image and/or coordinates of the region-of-interest in the template image. In some examples, the first item template may include size and/or orientation information describing dimensions and/or orientations of the barcode and/or the region-of-interest in the template image. In some examples, the first item template may define a type of the barcode associated with the item (e.g., a UPC1 code, a matrix code, etc.). The first entry may define a geometric and/or contextual relationship between the barcode in the template image and the region-of-interest in the template image.

Processing may continue at action 540, at which a sub-image representing a region-of-interest of the first item may be generated. The sub-image may be cropped from the captured first image data to represent the region-of-interest of the first item as represented in the captured first image data. The first region-of-interest of the first image data may be determined based at least in part on a comparison of one or more of the size, location, and/or orientation of the barcode in the captured first image data and one or more of the corresponding size, location, and/or orientation of the barcode defined by the first entry. Geometric transformations may be determined based on the comparison of the captured barcode and the barcode in the template image. Thereafter, these geometric transformations may be applied to the region-of-interest in the template image (e.g., to the bounding box defining the region-of-interest in the template image) and the transformed region-of-interest bounding box may be applied to the captured image data to determine the region of the captured image data that corresponds to the region-of-interest defined in the first entry. The captured image may then be cropped to generate the sub-image that corresponds to the region-of-interest of the first item.

Processing may continue at action 550, at which a first machine learning model (e.g., an image encoder) may generate a first vector representation of the sub-image. For example, a CNN-based encoder and/or another image encoder may generate a vector representation (e.g., a signature vector) representing the sub-image.

Processing may continue at action 560, at which the first vector representation of the sub-image may be compared to at least one second vector representation stored in the data store in association with the first entry. Any desired distance and/or similarity metric may be used to compare the first vector representation of the sub-image to the second vector representation associated with the first entry (e.g., Euclidean distance, cosine distance, cosine similarity, etc.).

Processing may continue at action 570, at which first data indicating that the first barcode is matched with the first item may be generated. For example, if the distance between the first vector representation and the second vector representation is less than a threshold distance, a determination may be made that the object matches the detected barcode. Similarly, if the similarity score (e.g., cosine similarity) exceeds a threshold similarity score, a determination may be made that the object matches the detected barcode. Conversely, if the relevant distance/similarity threshold is not satisfied, output data may be generated indicating that the object in the captured image does not match the barcode.

Figure 6B:
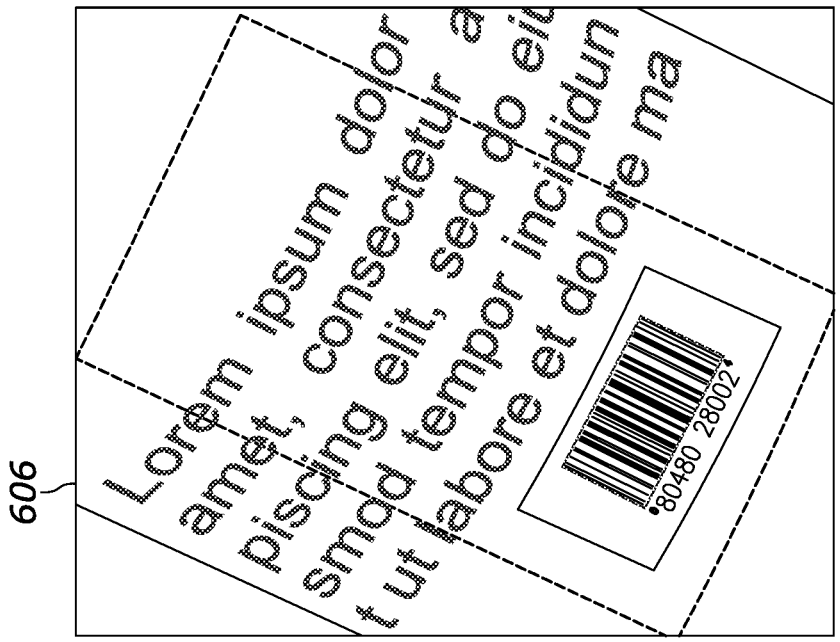
FIGS. 6A-6E depict various examples of sub-image extraction based on a region-of-interest defined in an object template, in accordance with various aspects of the present disclosure.
Figure 6A:
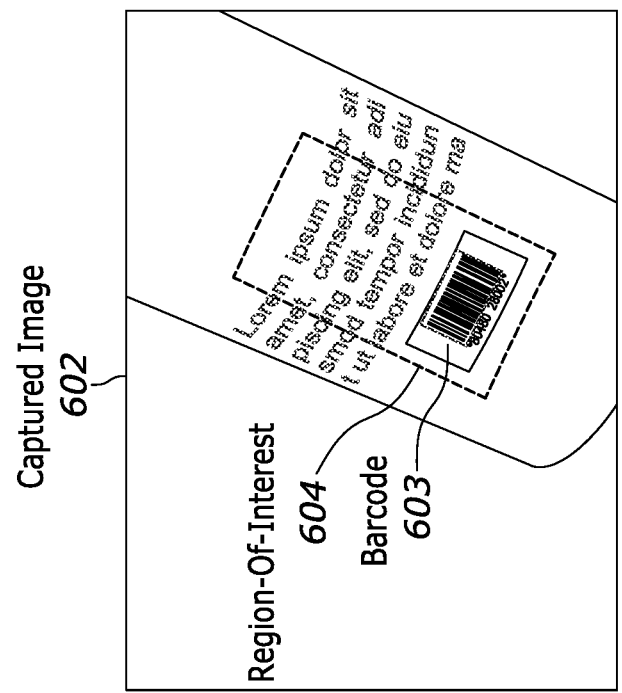

FIGS. 6A-6E depict various examples of sub-image extraction based on a region-of-interest defined in an object template, in accordance with various aspects of the present disclosure. FIG. 6A depicts an example captured image 602 captured by a barcode scanner. In the example image, a barcode 603 has been detected. Additionally, a region-of-interest 604 of the captured image 602 has been automatically determined using the object template, with the object template being identified using the barcode 603. Image 606 in FIG. 6B depicts an example cropping of the captured image 602 to the boundaries of the region-of-interest 604. Note that image 606 is not yet an extracted sub-image, it merely illustrates an example image cropping technique. Any desired image cropping technique may be used in accordance with the various aspects of the present disclosure.

Figure 6D:
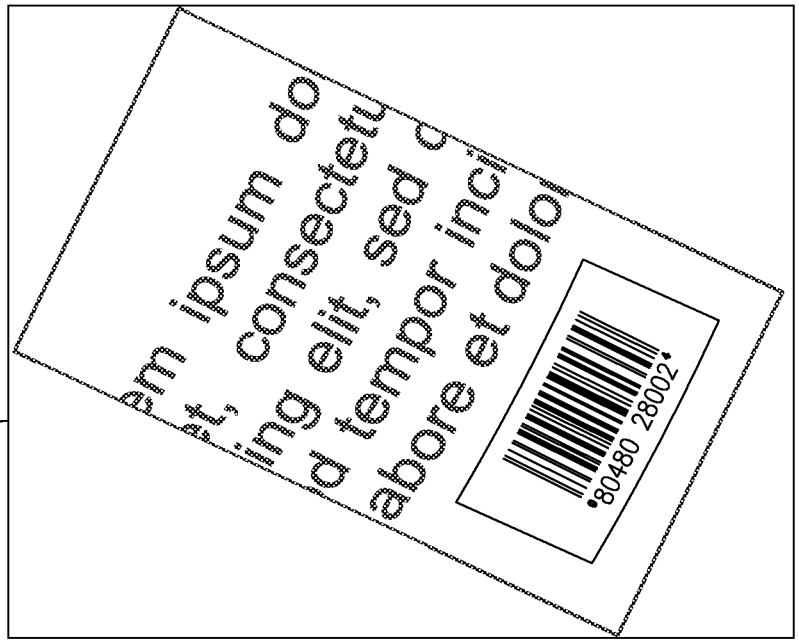
Figure 6C:
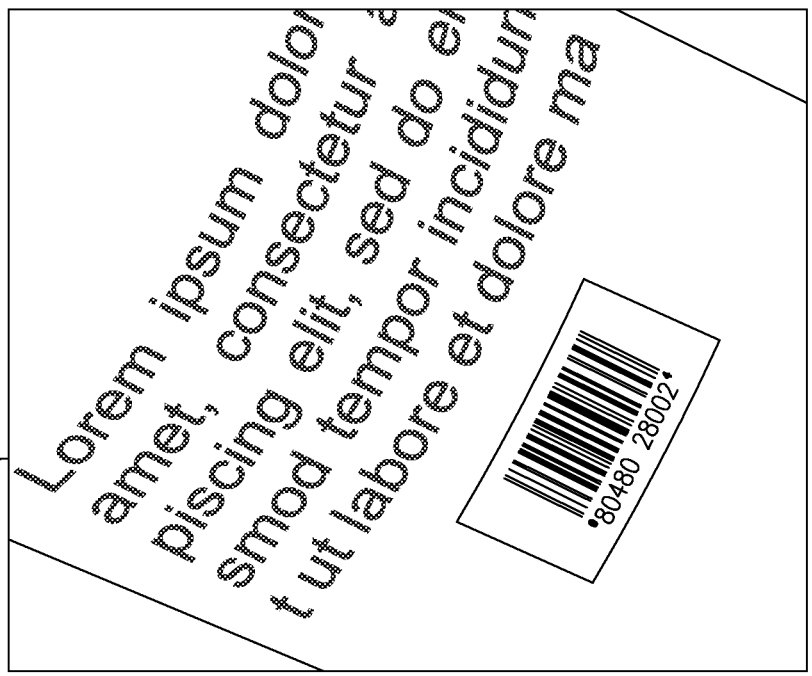

FIG. 6C depicts an example extracted sub-image 610a (in which the sub-image is extracted based on the cropping technique of image 606 in FIG. 6B). FIG. 6D depicts another example extracted sub-image 610b in which the cropping method of image 606 in FIG. 6B is used and the background of the sub-image has been filled with a predefined color (e.g., white).

Figure 6E:
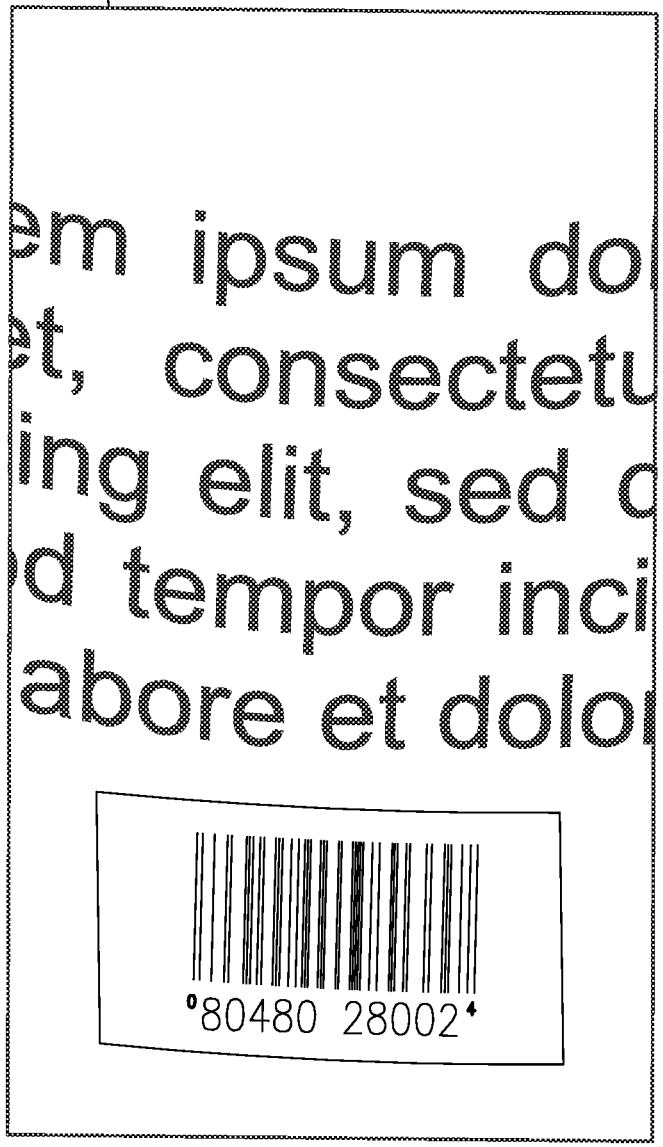

FIG. 6E depicts another example of an extracted sub-image 620 based on the cropping method of image 606 in FIG. 6B, and then de-skewing the cropped image in accordance with the object template (e.g., by rotating the image and/or re-sizing the image).

Among other potential benefits, the various barcode-aware object verification systems described herein may enable computing devices and/or barcode scanner devices to detect a ticket switch using computer vision techniques. In various examples, use of a relatively lightweight (in terms of memory requirements) image encoder may enable the image encoder to be deployed on resource-constrained devices, such as on the barcode scanner device and/or a point-of-sale device coupled to the barcode scanner.

The encoded representation of the sub-image of the item being scanned may be compared to the object template entry vector representation to determine whether the decoded barcode corresponds to the object. In various examples, no image data may need to be stored, thus conserving available memory and/or avoiding bandwidth-intensive transmission of image data to backend systems. In various examples, the barcode-aware object verification systems described herein may be deployed on a combination of a barcode scanner and some other device (e.g., a point of sale computing device configured in communication with the barcode scanner and/or a back-end computing device). For example, a database of object templates (e.g., representing the most often used object templates) may be stored in a memory on the barcode scanner, while the remainder of the object templates may be stored on the point of sale or back end computing device. Accordingly, the initial lookup for a decoded barcode may be performed in local memory (on the barcode scanner) and, if no result is found, the remote memory may be checked. In another example, a barcode scanner may initially search local memory using the barcode code. If an object template associated with the barcode is not found in the barcode scanner's local memory, the barcode code may be sent to another device for template lookup (e.g., a point of sale computing device, a back-end server, and/or any other computing device storing object template data that may be queried using barcode code data). The other, remote computing device may generate the signature vector(s) for the region-of-interest defined in the object template or the region-of-interest defined in the object template may be sent back to the barcode scanner for the generation of the signature vector(s). In general, there may be multiple combinations of processing steps that may occur on different devices and the specific operations which occur on any given device may vary from implementation to implementation. In another example, some object templates may identify a region-of-interest without storing signature vectors (e.g., to conserve memory), while other object templates may store one or more signature vectors for the region-of-interest. If a given object template does not include signature vectors, a device (e.g., the barcode scanner) may generate a signature vector for the region-of-interest in the captured image and may transfer it, along with the barcode data, to a remote system for further processing/identification/matching, etc.

Additionally, various techniques described herein enable a standardized region-of-interest of a scanned item to be determined based on a item template that establishes a geometric and contextual relationship between the item's barcode and a region-of-interest for that item. Standardizing the region-of-interest for comparison may result in more accurate representations and ticket-switch detection. Further, when a new item is added to inventory, no model re-training (e.g., of a machine learning classifier) is required in order to detect ticket switches for the new item. Instead, a new object template entry for the new item may be created that defines the region-of-interest for the item and stores an encoded representation of at least one image of the region-of-interest encoded using the pre-trained image encoder. Thereafter, when scanning the new item, the barcode retrieves the object template image and is used to extract the sub-image. The encoded representation of the sub-image can be compared against the encoded representation (e.g., one or more signature vectors) stored in the object template to determine whether the scanned barcode is properly associated with the object. In various examples, the region-of-interest may be standardized for multiple objects relative to the position of the barcode in these objects. This may eliminate the need for the object templates to store data that identifies a specific region-of-interest for each object.

In various other examples, a barcode scanner may store object templates of all relevant objects (e.g., all objects currently in inventory or supported by a particular system). However, due to memory constraints, one or more of the object templates may identify the relevant region-of-interest without storing an encoded representation (e.g., one or more signature vectors) due to memory constraints. In such cases, the barcode scanner may encode the sub-image extracted from the captured image and may send the resulting encoded representation (along with identifier data, such as barcode data) to another device that stores encoded representations for comparison/matching.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
capturing, by a scanner device comprising an image sensor, first image data representing at least a portion of a first item;
detecting, by the scanner device, a first barcode represented in the first image data;
decoding the first barcode to determine first identifier data for the first item;
performing a lookup using the first identifier data to determine a first entry for the first item stored in a data store;
generating a sub-image representing a region-of-interest of the first item;

generating, using an image encoder, a first vector representation of the sub-image;
comparing the first vector representation of the sub-image to at least one second vector representation stored in the data store in association with the first entry; and
generating first data indicating that the first barcode is matched with the first item.

2. The method of claim 1, wherein the comparing the first vector representation to the second vector representation comprises:
determining a distance between the first vector representation and the at least one second vector representation using a first distance metric; and
comparing the distance to a threshold distance value.

3. The method of claim 1, wherein the image encoder comprises a convolutional neural network or a vision transformer model trained for an image classification task.

4. The method of claim 1, wherein the image encoder comprises an encoder-decoder architecture, wherein parameters of the image encoder are updated based on a reconstruction loss determined based at least in part on differences between input image data and reconstructed image data generated by the decoder of the encoder-decoder architecture.

5. The method of claim 1, further comprising:
determining a pre-defined region-of-interest for the first item defined by the first entry; and
generating the sub-image representing the region-of-interest based at least in part by determining a portion of the first image data that corresponds to the predefined region-of-interest for the first item.

6. The method of claim 1, further comprising:
determining, using an object detector, a first bounding box around the first barcode in the first image data;
determining a first size of the first bounding box;
determining a second size of a second barcode associated with the first entry for the first item stored in the data store; and
determining a ratio between the first size and the second size.

7. The method of claim 6, wherein the generating the sub-image further comprises:
determining a second bounding box representing a pre-defined region-of-interest of the first item defined by the first entry;
resizing the second bounding box using the ratio; and
applying the re-sized second bounding box to the first image data.

8. The method of claim 1, further comprising:
capturing, by the scanner device, second image data representing at least a portion of a second item;
detecting, by the scanner device, a second barcode represented in the second image data;
decoding the second barcode to determine second identifier data for the second item;
performing a lookup using the second identifier data to determine a second entry for the second item stored in the data store;
generating a second sub-image representing a second region-of-interest of the second image data that comprises the second barcode and a second non-barcode portion of the second item;
generating, using the image encoder, a third vector representation of the second sub-image;
comparing the third vector representation of the second sub-image to a fourth vector representation stored in the data store in association with the second entry; and
generating output data indicating that the second barcode is mismatched with respect to the second item based at least in part on the comparing the third vector representation to the fourth vector representation.

9. The method of claim 1, further comprising:
capturing, by the scanner device, second image data representing at least a portion of a second item;
detecting, by the scanner device, a second barcode represented in the second image data;
decoding the second barcode to determine second identifier data for the second item;
generating a new entry in the data store comprising the second identifier data;
generating a second sub-image representing a second region-of-interest of the second item;
storing second data in association with the new entry, the second data defining the second region-of-interest for images of the second item;
generating, using the image encoder, a third vector representation of the second sub-image; and
storing the third vector representation in the data store in association with the new entry.

10. The method of claim 1, wherein the first entry represents at least one of a contextual or a geometric relationship between the first barcode and the first region-of-interest of the first item.

11. The method of claim 1, wherein the first entry comprises data representing a barcode type of the first barcode.

12. The method of claim 1, wherein the first entry comprises:
a template image of the first region-of-interest of the first item; and
at least one of coordinate data representing a location in the template image of the first barcode, orientation data representing an orientation in the template image of the first barcode, or size data representing a size of the first barcode in the template image, and
wherein the generating the sub-image representing the region-of-interest of the first item is based at least in part on at least one of the coordinate data, the orientation data, or the size data.

13. A system comprising:
an image sensor;
at least one processor; and
non-transitory computer-readable memory storing instructions that, when executed by the at least one processor, are effective to:
control an image sensor to capture first image data representing at least a portion of a first item;
detect a first barcode represented in the first image data;
decode the first barcode to determine first identifier data for the first item;
perform a lookup using the first identifier data to determine a first entry for the first item stored in a data store of the non-transitory computer-readable memory;
generate a sub-image representing a region-of-interest of the first item;
generate, using an image encoder, a first vector representation of the sub-image;
compare the first vector representation of the sub-image to at least one second vector representation stored in the data store in association with the first entry; and
generate first data indicating that the first barcode is matched with the first item.

14. The system of claim 13, wherein to compare the first vector representation to the at least one second vector representation the at least one processor is further effective to:
  determine a distance between the first vector representation and the at least one second vector representation; and
  compare the distance to a threshold distance value.

15. The system of claim 13, wherein the image encoder comprises an encoder-decoder architecture, wherein parameters of the image encoder are updated based on a reconstruction loss determined based at least in part on differences between input image data and reconstructed image data generated by the decoder of the encoder-decoder architecture.

16. The system of claim 13, the non-transitory computer-readable memory storing further instructions that, when executed by the at least one processor, are further effective to:
  determine a pre-defined region-of-interest of the first item defined by the first entry; and
  generate the sub-image representing the region-of-interest based at least in part by determining a portion of the first image data that corresponds to the predefined region-of-interest for the first item.

17. The system of claim 13, the non-transitory computer-readable memory storing further instructions that, when executed by the at least one processor, are further effective to:
  determine, using an object detector, a first bounding box around the first barcode in the first image data;
  determine a first size of the first bounding box;
  determine a second size of a second barcode associated with the first entry for the first item stored in the data store; and
  determine a ratio between the first size and the second size.

18. The system of claim 17, wherein to generate the sub-image the at least one processor is further effective to:
  determine a second bounding box representing a pre-defined region-of-interest of the first item defined by the first entry;
  resize the second bounding box using the ratio; and
  apply the re-sized second bounding box to the first image data.

19. The system of claim 13, the non-transitory computer-readable memory storing further instructions that, when executed by the at least one processor, are further effective to:
  control the image sensor to capture second image data representing at least a portion of a second item;
  detect a second barcode represented in the second image data;
  decode the second barcode to determine second identifier data for the second item;
  perform a lookup using the second identifier data to determine a second entry for the second item stored in the data store;
  generate a second sub-image representing a second region-of-interest of the second image data;
  generate, using the image encoder, a third vector representation of the second sub-image;
  compare the third vector representation of the second sub-image to a fourth vector representation stored in the data store in association with the second entry; and
  generate output data indicating that the second barcode is mismatched with respect to the second item based at least in part on the comparing the third vector representation to the fourth vector representation.

20. The system of claim 13, the non-transitory computer-readable memory storing further instructions that, when executed by the at least one processor, are further effective to:
  control the image sensor to capture second image data representing at least a portion of a second item;
  detect a second barcode represented in the second image data;
  decode the second barcode to determine second identifier data for the second item;
  generate a new entry in the data store comprising the second identifier data;
  generate a second sub-image representing a second region-of-interest of the second image data;
  store second data in association with the new entry, the second data defining the second region-of-interest for images of the second item;
  generate, using the image encoder, a third vector representation of the second sub-image; and
  store the third vector representation in the data store in association with the new entry.

21. A method comprising:
  receiving first image data representing at least a portion of a first item;
  detecting a first barcode represented in the first image data;
  decoding the first barcode to determine first identifier data for the first item;
  performing a lookup using the first identifier data to determine a first entry for the first item stored in a data store;
  generating a sub-image representing a region-of-interest of the first item;
  generating, using an image encoder, a first vector representation of the sub-image;
  comparing the first vector representation of the sub-image to at least one second vector representation stored in the data store in association with the first entry; and
  generating first data indicating that the first barcode is matched with the first item.

22. The method of claim 21, wherein the comparing the first vector representation to the at least one second vector representation comprises:
  determining a distance between the first vector representation and the at least one second vector representation using a first distance metric; and
  comparing the distance to a threshold distance value.

23. The method of claim 21, further comprising determining the region-of-interest for the first entry using segmentation to separate first pixels representing the first item in the first image data from second pixels representing background in the first image data.

* * * * *